3,394,021
METHOD OF FORMING A SYNTHETIC MARBLE
Edward A. Bush, Corning, N.Y., and David Rostoker, Tioga, Pa., assignors to Corning Glass Works, Corning, N.Y., a corporation of New York
No Drawing. Filed Nov. 3, 1965, Ser. No. 506,265
10 Claims. (Cl. 106—286)

ABSTRACT OF THE DISCLOSURE

Method of making a synthetic marble product which is capable of taking a polish, by pressing a substantially homogeneous, particulate mixture comprised of calcium carbonate with an effective amount of an alkali carbonate additive at a sufficient temperature and a corresponding pressure and for a time such that a coherent crystalline body is formed, and furthermore the product formed by the process.

---

This invention relates to a synthetic marble product and more particularly to an improved method of forming a synthetic marble product by recrystallizing minute calcium carbonate particles.

Since ancient times, marble has been extensively used by man for building and ornamental purposes because of its great beauty, long durability, and varieties of colors. For purposes of classification, there are two general groups of marbles; the calcite marbles which are almost pure calcium carbonate and the dolomite marbles which contain a high percent of magnesium carbonate. The term marble is applied commercially to either rock if it is capable of taking a polish.

Natural marbles are metamorphic rocks formed essentially from the recrystallization of limestone. In nature, limestone may become plastic under elevated pressures and high temperatures and, over a long time interval this plastic material subsequently solidifies and recrystallizes. However, marble being a product of nature is commonly inhomogeneous and may possess fractures and impurities that impair its dimensional stability. Marble can be cut and shaped to alter its physical appearance, but its physical properties like its great beauty, are often nonuniform and unpredictable.

It has been known for many years that marble may be deformed plastically under high confining pressure and at room temperature. Research has been conducted on the mechanism of marble deformation by D. T. Griggs et al., and reported in a chapter entitled, Annealing Recrystallization in Calcite Crystals and Aggregates, Rock Deformation, Geological Society of America Memoir 79, pages 21–38. The behavior of calcite and marble at temperatures of several hundred degrees and confining pressures of a few thousand atmospheres has been suggested to be similar to that of a ductile metal at atmospheric pressure. Griggs deformed powdered marble at room temperature to a degree where strain hardening occurred. Such deformation at temperatures low enough to permit noticeable strain hardening without recrystallization is similar to metallurgical "cold working," as contrasted with "hot working" at temperatures high enough for new crystals to nucleate at the expense of the strained crystals. He subsequently heated the deformed material to a point of annealing recrystallization. It was also demonstrated that recrystallization due to shear strain designated as "syntectonic recrystallization," produced a fabric of highly preferred orientation. In these experiments Griggs used pressures of 5 kilobars (72,000 p.s.i.) or greater for most of his work. Unfortunately, the conditions necessary to produce Griggs's product are not commercially practical.

In the copending application of D. Rostoker entitled "Synthetic Marble," Ser. No. 502,573, filed on Oct. 22, 1965, there is described a method of making a synthetic marble product which is capable of taking a polish by grinding calcite having a minimum purity of 98% calcium carbonate to a particle size of less than 325 mesh and pressing the calcite particle in a carbon dioxide atmosphere at a temperature of 775 to 1,000° C. and at a pressure of 1,000 to 3,000 p.s.i. for a time of 10 to 120 minutes to form a coherent body. According to that method it was possible to form a marble body at pressures previously thought not to be possible. However, at the high temperatures required, it was necessary to use relatively expensive forming equipment, such as molybdenum alloy and nickel alloy dies, during the pressing operation. These materials tended to be highly reactive under the operating conditions with the calcium carbonate being pressed and consequently the dies had to be treated frequently with a protective coating.

Quite surprisingly we have now found that by the addition of very small amounts of an additive, we are able to significantly reduce the pressing temperature without substantially increasing the required pressure. Under the conditions of the present invention, we can now use stainless steel dies which are much less expensive than those heretofore used and considerably less subject to corrosion.

It is therefore an object of the present invention to provide a synthetic marble product, essentially indistinguishable in appearance from the natural product.

It is a further object of the present invention to provide a synthetic marble product having various colors and textures.

In accordance with the present invention, we have discovered a method of making a synthetic marble product which is capable of taking a polish by pressing a substantially homogeneous particulate mixture of calcium carbonate and an effective amount of an alkali metal carbonate additive selected from the group consisting of lithium carbonate, sodium carbonate, potassium carbonate, and mixtures thereof at a sufficent temperature and corresponding pressure for a time such that a coherent crystalline body is formed. When made in the shape of a boule, the resulting marble can be cut into slabs, and thereafter polished according to the conventional procedures used for natural marble. The product is comparable in aesthetic appearance to the natural stone, and exhibits strength and impact resistance values in excess of many natural marbles. Thus the novel method can be used to produce large blocks of highly pure, fracture-free, completely homogeneous marble for use as architectural veneers.

The marble prepared according to the present invention has numerous advantages over natural marble. To a large extent these are associated with the fact that the texture, quality, color, and dimensional size can be controlled and are not subject to the vagaries of nature.

In one embodiment of the present invention, we have discovered a method of making a marble product by mixing ground calcite marble or precipitated calcium carbonate with a small amount of sodium and lithium carbonates in optimum ratio, pressing the powders at a sufficient temperature and pressure to effect full densification, and holding at elevated temperature and pressure until recrystallization and grain growth have yielded a coherent body. The cooled body is then cut and polished by conventional procedures used in the marble industry.

For purposes of definition the term "sintering" as used herein applies to strengthening and densification of powdered aggregates whereby the aggregates are caused to become a coherent nonporous mass by heating without melting. This results in increasing the bond strength between two surfaces in contact and decreasing the void content of a porous body i.e. densification. The term "recrystallization" pertains to the nucleation and growth of new, strain-free crystals in an existing assembly of grains which have been rendered thermally unstable by deformation. "Crystalline body" as used herein, applies to a body wherein the structure has been formed by crystallization or by recrystallization.

The process described herein involves sintering of calcium carbonate particles as precipitated powder or ground calcite marble in the presence of a liquid phase which promotes solution and redeposition of the calcium carbonate and effects the crystallization or recrystallization and grain growth necessary for an aesthetically textured body that is sufficiently cohesive to exhibit the desirable physical properties of natural marble.

The improved marble forming composition of the present invention is comprised primarily of two components: a high purity calcium carbonate and very small amounts of an alkali metal carbonate additive. Both components are finely ground and mixed until the additive has been substantially homogeneously dispersed. The calcium carbonate must be at least 98% pure and may be in the form of precipitated calcium carbonate, available commercially as Analytical Reagent or USP grades, or as finely ground calcite marble, a particularly good source of which is Yule, Colorado marble. Various textural effects may be achieved in the final marble product by combining coarsely ground marble having a size range of from 10 to 30 mesh (U.S. sieve size) with fine grain particles of ground marble or precipitated calcium carbonate having a grain size of less than about 325 mesh. The charge may then be mixed with approximately equal parts of the coarse grain and fine grain particles.

The addition of small amounts of the alkali metal carbonate additive is a very important factor in making the present process commercially feasible. During the pressing step, the additives form a liquid phase with the calcium carbonate promoting a solution and redeposition of the calcium carbonate. Alkali metal carbonates which are useful in our process are the carbonates of lithium, sodium, and potassium. The other alkali metal carbonates, cesium carbonate and rubidium carbonate being very readily leached by water and the most costly, were considered to be not practical. It is generally preferred that combinations of the alkali metal carbonates, in particular the eutectic mixtures of two or more of the alkali metal carbonates be used, since the individual carbonates alone have higher melting points than the mixtures. Particularly effective are the binary eutectic combinations of lithium carbonate-sodium carbonate and lithium carbonate-potassium carbonate and the ternary eutectic mixture of lithium carbonate-potassium carbonate-sodium carbonate. The preferred additive is the lithium carbonate-sodium carbonate eutectic which has been described in the literature as composed of approximately 56.8% sodium carbonate and 43.2% lithium carbonate. Whereas lithium carbonate and sodium carbonate are sparingly soluble in water, potassium carbonate is to some extent leached by water. It is therefore desirable when the marble product is made for external cladding that the potassium carbonate level be relatively low or nil. Effective amounts of the additive are generally in the range of 0.5 to 1.5 parts by weight to 100 parts by weight of calcium carbonate. When using mixtures of more than one alkali metal carbonate, it is preferable to prefuse the additive and then form a homogeneous mixture by grinding the fused material directly with the calcium carbonate.

The pressing step involves subjecting the marble forming composition to conditions of temperature and pressure for a sufficient time to form a coherent crystalline marble body. The primary variables are the temperature, pressure, and time. We have found that the temperature range required is from 500 to 600° C. At temperatures below 500° C., the marble forming composition usually does not become sufficiently plastic or fluid to form a coherent body; whereas at temperatures above 600° C. the composition becomes extremely plastic making it impossible to control the reaction and resulting in a nonuniform and frequently porous product. The corresponding pressure range is between 2,000 and 10,000 p.s.i., to obtain the required plasticity. Pressures outside this range were found to be unworkable. Under these conditions of temperature and pressures, it is possible to use commercially available stainless steel dies. The time required to produce a coherent marble body is generally from 10 to 120 minutes and longer periods can, of course, be used. It is generally preferred to press the calcite particles for at least 30 minutes.

After the formed synthetic marble body is cooled and removed from the press, it is subjected to the final finishing operation. This involves cutting the marble to the proper dimensions and polishing the surface to the final depth of reflection using conventional techniques. The marble product obtained by the above procedure is a pure white marble which is most highly prized for architectural veneers.

In another embodiment of our invention, we have discovered a process for making colored marble products which are generally uniformly colored or have colored streaks and swirls. Various colored marbles may be made by adding and mixing a compatible coloring agent with the particulate marble forming composition and then pressing the mixture to form a colored coherent body. Useful coloring agents are inorganic compounds which are thermally stable or form thermally stable colors. As another requirement, the coloring agent must be nonreactive with calcium carbonate and chemically stable in the system. Substantially anhydrous compounds should be used as water evolving at the high operating temperatures and may act as a medium for acid-base reactions. Oxidizing agents or compounds which decompose to form oxidizing agents under the forming conditions, such as halides, phosphates, sulfates, and sulfides, should be avoided. It is further important that the coloring agent be dispersible in the ground calcite without requiring addition of incompatible dispersing agents and that the coloring agent be non-leachable by water. Coloring agents which have been found particularly effective and useful in the present invention are the oxides or carbonates of metals having an atomic number of 24 to 29 and 82. These are the oxides and carbonates of chromium, manganese, iron, cobalt, nickel, copper, and lead. Particularly effective coloring agents are naturally occurring carbonates such as siderite and rhodochrosite. Generally the coloring agents are added in quantities from 2 to 5% by weight.

Our invention is further illustrated by the following examples:

Example I

Precipitated calcium carbonate (Analytical Reagent grade), 49.75 grams, were mixed with 0.145 gram of $Li_2CO_3$ and 0.105 gram $Na_2CO_3$ in a ball mill. The powder was placed in a molybdenum alloy die that had been coated with an alumina wash. The die and contents were placed in a standard hot press and a positive pressure of carbon dioxide was maintained throughout the experiment. The carbon dioxide was necessary to protect the susceptor from oxidation rather than prevent calcination of the carbonates.

The die and sample were heated to 300° C. and a pressure of 3,000 p.s.i. applied. The die was further heated to 550° C. and held for 15 minutes until ram travel had ceased thereby indicating full compaction. The pressure was allowed to drop to 2,000 p.s.i. and held for 15 minutes.

Thereafter the sample was cooled, removed from the die, and cut and polished. The product was a coherent body having a pure white color and exhibiting a recrystallized texture with polygonal grains up to 15 microns. The polished sample was indistinguishable from natural marble. Its density was 98% and its rupture strength (MOR)

was found to be 5,500 p.s.i. as compared to natural marble which has a rupture strength of 1,900 p.s.i., average.

Example II

Following the procedure of Example I, pieces of Yule marble ground in a ball mill to less than 375 mesh were substituted for the precipitated calcium carbonate powder. The product obtained was similar in appearance to that of Example I. It exhibited a density of 97% and a rupture strength (MOR) of 3,000 p.s.i. Upon examination, the microstructure of the body indicated that gain growth had occurred.

Example III

In order to determine the operating temperature and pressure useful for the novel process, the procedure of Example I was repeated with the following modifications:

(A) While maintaining a constant pressure of 3,000 p.s.i. during the pressing step, the temperature was increased to 600° C. It was observed that the material being pressed became so plastic that it began to extrude between the plunger and the wall of the die. The body formed was porous and exhibited numerous large holes. It was generally of a nonhomogeneous appearance.

(B) Attempts to press ground marble at a pressure of 3,000 p.s.i. and temperatures up to 500° C. were unsuccessful as the marble forming composition was too nonplastic to densify. The pressure was then raised to 10,000 p.s.i. but no densification occurred. The resultant product exhibited no sintering and may be described as a powder pact.

Example IV

Following the procedure of Example I, various modifications were made to determine the optimum amount of alkali metal carbonate additive and the effect of changing the additive to approximately the ternary eutectic mixture. The data setting forth the composition in percent by weight of the additive, the pressing temperatures, the parts by weight of additive per 100 parts by weight of calcium carbonate, and a description of the product obtained are shown in the table below:

TABLE I

| Exp. | T.,° C. | Li$_2$CO$_3$ Percent | Na$_2$CO$_3$ Percent | K$_2$CO$_3$ Percent | Parts | Product |
|---|---|---|---|---|---|---|
| AA | 550 | 58 | 42 | --------- | 0.5 | Good Body. |
| AB | 550 | 58 | 42 | --------- | 1.5 | Slightly Porous Body. |
| AC | 550 | 58 | 42 | --------- | 0.4 | Poor Densification. |
| AD | 500 | 35 | 32 | 33 | 0.5 | Good Body. |

These results indicate that at least 0.5 part by weight per 100 parts of calcium carbonate is the minimum amount of additive required and that a concentration of greater than 1.5 parts by weight of the additive per 100 parts of calcium carbonate is too high.

Example V

Following the procedure of Example I, an experiment was performed in which the pressing step occurred in an air atmosphere rather than in carbon dioxide. The resultant product was satisfactory and exhibited no evidence of calcination or decomposition of the carbonates.

Example VI

Following the procedure of Example II, various powdered coloring agents in an amount of 2 to 5 parts by weight per 100 parts by weight of calcium carbonate were added and ground with the marble forming composition prior to the pressing step. The additives, the amount of additive used in parts by weight per 100 parts by weight of calcium carbonate, and the color produced in the final marble products are set forth in the table below:

TABLE II.—ADDITION OF COLORING AGENTS

| Exp. | Additive | Amount | Color of Marble Body |
|---|---|---|---|
| BA | CrCO$_3$ | 3-5 | Light green. |
| BB | MnCO$_3$ (Rodochrosite) | 3-5 | Green to brown. |
| BC | FeCO$_3$ (siderite) | 3-5 | Deep brown. |
| BD | CoCO$_3$ | 3-5 | Dark olive green. |
| BE | NiCO$_3$ | 3-5 | Black. |
| BF | CuCO$_3$ | 2-3 | Red to maroon. |
|    |          | 4-5 | Black. |
| BG | Pb$_3$O$_4$ | 3-5 | Cream, orange-red. |

It was observed that nitrates, e.g., Ni(NO$_3$)$_2$ and Co(NO$_3$)$_2$ gave an unsatisfactory product.

We claim:

1. A method of making a synthetic marble product, which is capable of taking a polish, comprising pressing a substantially homogeneous particulate mixture comprised of calcium carbonate with an effective amount in the range of 0.5–1.5 parts by weight to 100 parts by weight of calcium carbonate of an alkali metal carbonate additive selected from the group consisting of lithium carbonate, sodium carbonate, potassium carbonate, and mixtures thereof at a sufficient temperature of 500–600° C., and corresponding pressure of 2,000–10,000 p.s.i. and for a time such that a coherent crystalline body is formed.

2. The mehtod of claim 1, wherein said particulate mixture contains 100 parts by weight of calcium carbonate at least 98% pure and 0.5–1.5 parts by weight of said alkali metal carbonate additive.

3. The method of claim 2, wherein the time is 10–120 minutes.

4. The method of claim 3, wherein said additive is a prefused lithium carbonate-sodium carbonate eutectic mixture.

5. The method of claim 3, wherein a chemically compatible, inorganic coloring agent which is non-reactive with calcium carbonate, is added to said particulate mixture.

6. The method of claim 5, wherein said inorganic coloring agent is a carbonate or an oxide of a metal selected from the group of elements having an atomic number of 24–29 and 82.

7. The method of claim 6, wherein said inorganic coloring agent is a member selected from the group consisting of siderite and rhodochrosite.

8. A synthetic marble product which is capable of taking a polish consisting essentially of 100 parts by weight of calcium carbonate having a purity of 98% and 0.5–1.5 parts by weight of an alkali metal carbonate additive selected from the group consisting of lithium carbonate, sodium carbonate, potassium carbonate, and mixtures thereof.

9. The product of claim 8, containing additionally 2–5 parts by weight of a chemically compatible inorganic coloring agent which is non-reactive with calcium carbonate.

10. The product of claim 8, wherein said alkali metal carbonate is a mixture of at least two of said carbonates.

References Cited

FOREIGN PATENTS 481,706   3/1952   Canada.
484,167   6/1952   Canada.

OTHER REFERENCES

Chemical Abstracts 4208i, vol. 44, Schwob, "The Simple and Complex Rhombohedral Carbonates of Calcium, Magnesium, and Iron—Their Thermal Dissociation," copy in Chemical Library.

JAMES A. SEIDLECK, *Primary Examiner.*

T. MORRIS, *Assistant Examiner.*